United States Patent [19]

Glass et al.

[11] Patent Number: 4,606,024

[45] Date of Patent: Aug. 12, 1986

[54] HIERARCHICAL DIAGNOSTIC TESTING ARRANGEMENT FOR A DATA PROCESSING SYSTEM HAVING OPERATIONALLY INTERDEPENDENT CIRCUIT BOARDS

[75] Inventors: Kathleen K. Glass, Boulder; Lawrence J. Haas, Broomfield, both of Colo.

[73] Assignee: AT&T Bell Laboratories, Murray Hill, N.J.

[21] Appl. No.: 451,258

[22] Filed: Dec. 20, 1982

[51] Int. Cl.[4] .............................................. G06F 11/00
[52] U.S. Cl. ........................................ 371/16; 371/18
[58] Field of Search ............................ 371/16, 18, 20; 364/200, 900

[56] References Cited

U.S. PATENT DOCUMENTS

| | | |
|---|---|---|
| 4,253,183 | 2/1981 | Taylor et al. ........................ 371/16 |
| 4,315,311 | 2/1982 | Causse et al. ...................... 364/200 |
| 4,315,313 | 2/1982 | Armstrong et al. ................ 364/200 |
| 4,315,314 | 2/1982 | Russo ................................. 364/200 |
| 4,355,389 | 10/1982 | Sato ................................... 371/18 |
| 4,371,952 | 2/1983 | Schurk ............................... 371/16 |
| 4,410,984 | 10/1983 | Negi ................................... 371/16 |
| 4,417,336 | 11/1983 | Weilbacker ......................... 371/20 |
| 4,433,412 | 2/1984 | Best et al. .......................... 371/16 |
| 4,453,213 | 6/1984 | Romagasa .......................... 371/16 |
| 4,489,414 | 12/1984 | Titherley ............................ 371/20 |
| 4,499,581 | 2/1985 | Miazga et al. ..................... 371/16 |
| 4,500,993 | 2/1985 | Jacobson ............................ 371/16 |

Primary Examiner—Michael R. Fleming
Attorney, Agent, or Firm—Donald M. Duft

[57] ABSTRACT

A diagnostic test facility for a processor having a plurality of boards hierarchically arranged with respect to processor function.

The first and most independent board contains the processor microstore that stores the usual information plus the processor diagnostic subroutines required to test all boards. The processor is tested by executing the diagnostic subroutines associated with the first board and by collecting and comparing test data with predicted data as the subroutines are executed. The second board is tested by using the facilities on the first board and by executing diagnostic subroutines associated with the second board. In a similar manner the remaining hierarchically arranged boards are tested in sequence with the testing of each board using the circuitry on the priorly tested boards.

13 Claims, 4 Drawing Figures

HIERARCHICAL DIAGNOSTIC TESTING ARRANGEMENT FOR A DATA PROCESSING SYSTEM HAVING OPERATIONALLY INTERDEPENDENT CIRCUIT BOARDS

TECHNICAL FIELD

This invention relates to diagnostic circuitry for identifying hardware faults in the processor of a data processing system.

BACKGROUND OF THE INVENTION

As data processing systems become more complex, the task of system maintenance becomes more complex. To provide more efficient and economical maintenance procedures, a data processing system typically may be divided into sections that can be independently diagnosed. Diagnostic circuitry is used to detect hardware faults in these various sections of the system and specifically in the system processor.

Several approaches have been proposed for using diagnostic circuitry to identify operational faults in the system processor of a data processing system. One such approach is found in U.S. Pat. No. 4,315,314 issued to P. M. Russo. There, diagnostic logic is connected to the system processor and diagnostic subroutines are stored in a memory location external to the system processor. When a hardware fault is suspected, externally generated service requests interrupt the normal system processor operation and disable the main memory. Thereafter, the system processor accesses the externally located diagnostic subroutines and executes those subroutines. This method of isolating hardware faults relies on the normal accessing operation of the system processor and, therefore, hardware fault isolation is precluded when the system processor is nonoperational.

Another approach using diagnostic circuitry to identify hardware faults in the system processor is found in U.S. Pat. No. 4,315,313 issued to A. G. Taylor et al. There, each replaceable module or circuit board located in the system processor is associated with a diagnostic snap shot circuit. The testing of each individual board is independent of all other boards. Each diagnostic snap shot circuit records signals or data from various test points on the associated board in response to a snap shot command. The test data for each board is thereafter analyzed, and an independent fault determination is made for each board. This method of diagnosing hardware faults is incomplete because the boards are tested in an artificial environment. That is, each board is tested on a random individual basis which isolates each board from the many normal processing operations that are dependent on circuitry located on other system processor boards. Further, since this method of diagnosing hardware failures requires additional processor space to accommodate one diagnostic snap shot circuit per board, it provides a noneconomical solution to diagnosing hardware failures.

There has accordingly arisen a need for diagnostic circuitry that can accomplish the process of diagnosing hardware failures in a system processor so that a field engineer can carry out maintenance procedures simply and efficiently. There presently exists no diagnostic circuitry that monitors board level circuits by a single diagnostic device and that tests such circuitry in a manner analogous to normal processing operations.

SUMMARY OF THE INVENTION

In accordance with the disclosed exemplary embodiment of the invention there is provided a single diagnostic processor located external to the system processor of a data processing system. In addition, a single diagnostic circuit connects to a plurality of replaceable boards that comprise the system processor. These circuit boards operate in an interdependent and hierarchical manner such that all boards are increasingly dependent on the prior boards' operations. The least dependent board is designated as the most operationally independent board upon which all further boards rely to carry out normal processing operations. When a hardware fault (including discrete hardware elements and firmware associated therewith) is suspected in the system processor, the diagnostic processor activates the diagnostic circuit which interrupts the normal processor operation. The diagnostic processor and the diagnostic circuitry run a microdiagnostic test to isolate a fault to the board level.

Specifically, when a field engineer suspects a hardware fault the engineer selects the prescribed code for a specific microdiagnostic test. The starting addresses for test subroutines that compose the microdiagnostic test are stored in the diagnostic processor. The diagnostic processor applies a starting address of a microdiagnostic subroutine to the single diagnostic circuit located within the system processor to begin the microdiagnostic test.

The diagnostic circuit simultaneously interrupts the normal processing operation sequence and forces a starting address of a microdiagnostic test subroutine into the circuit component that controls system processor operation. The extensive software formerly required to carry out a microdiagnostic test subroutine is eliminated since a microdiagnostic subroutine initiates at the circuit level.

The microdiagnostic test executes in a manner analogous to the normal hierarchical operation of the system processor. The most operationally independent board is tested first, and thereafter, further boards each associated with a starting address of a microdiagnostic routine are tested as to the order of dependency with the most dependent board being tested last. This manner of diagnostic testing allows for diagnosing hardware failures within the context of the operational parameters for each board rather than checking discrete circuits or boards apart from the normal interdependent operation. Thus, this method of testing eventually tests the entire system processor within the context of normal operational processes.

During the microdiagnostic test, a single diagnostic circuit monitors and records signals applied over test buses from circuit test points on the boards under test. This single circuit design eliminates the need for diagnostic circuitry on each board. The value accumulated from the circuit test points at the conclusion of each test subroutine results in a signature formed by a signature analysis chip. The formed signature is read by the diagnostic processor and compared to a known valid signature. There is no fault when the known and recorded signatures match. There is a fault, however, when the two signatures do not match. A signature for each board is formed and compared during the microdiagnostic test. The microdiagnostic test is completed when the signatures from the plurality of boards prove valid. However, the microdiagnostic test is stopped when a signature from a board in the sequential testing process proves invalid.

The faulty or nonfaulty condition of the boards are indicated by external devices. For example, a display on an alarm panel indicates whether a hardware fault exists in the system processor. Displays on the boards indicate whether and on which board the hardware fault exists. Normal processing operations are resumed with minimal interruptions when the hardware fault is traced to a particular board and that board is immediately replaced. This method of isolating hardware faults provides for efficient and economical maintenance procedures.

BRIEF DESCRIPTION OF THE DRAWINGS

This invention may be better understood by reading the following detailed description with reference to the accompanying drawings wherein.

DETAILED DESCRIPTION

Figure 1:
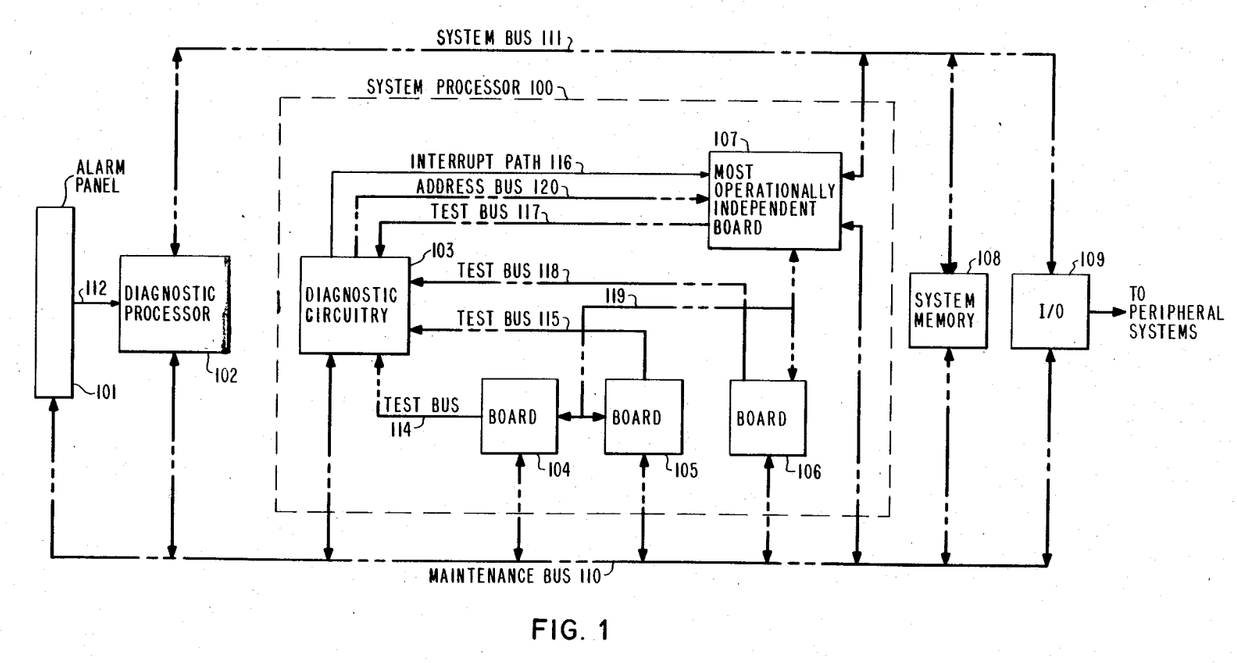
FIG. 1 discloses a data processing system to which an external diagnostic testing source, a diagnostic processor, is connected to a diagnostic circuit in accordance with the present invention.

FIG. 1 illustrates a data processing system embodying the present invention. The system comprises system processor 100, alarm panel 101, diagnostic processor 102, system memory 108 and I/O interface 109.

System processor 100 exchanges information including commands, program instructions and data with system memory 108 over system bus 111. Data is transferred over system bus 111 via I/O interface 109 to peripheral systems (not shown). Such a data-handling system is well known in the art and therefore requires no further explanation.

In a data processing system, it is essential that any hardware faults be diagnosed as quickly and as efficiently as possible so as to cause minimal interference with the processing of data. A diagnostic test is initiated when a hardware fault is suspected in the system processor circuitry during normal processor operations. The results of the test indicate whether a fault exists and whether immediate service is necessary. Such diagnostic testing is also initiated upon system power-up. A diagnostic test can be implemented either locally, that is, at the location of the system processor, or remotely. The test can be either started by a human operator or by a mechanism such as a remote computer via a communication link with the system processor. For purposes of explanation, hereinafter, assume that the diagnostic test is implemented locally and started by a human operator.

In the described embodiment, a diagnostic processor 102, located external to system processor 100, is connected to system processor 100 by maintenance bus 110. Diagnostic processor 102 stores starting addresses for the microdiagnostic test. Each starting address is associated with a microdiagnostic subroutine for each board in system processor 100. Assume that a field engineer suspects that a hardware fault exists in system processor 100. The engineer then initiates the diagnostic test by selecting the prescribed test code by means of an indicator button located on alarm panel 101. The prescribed test code from alarm panel 101 is applied over bus 112 to diagnostic processor 102. Thereafter, in response to the prescribed test code, diagnostic processor 102 applies a starting address over maintenance bus 110 which initiates the microdiagnostic test of the elements of system processor 100. Prior to accessing each starting address that comprises the microdiagnostic test, the circuitry within system processor 100 is placed in a known value state so that any stray data is precluded. The circuit for initializing the system to a known state is not shown since all systems can be regulated to produce a known condition by a variety of methods. After the diagnostic test is completed, test signals are read over maintenance bus 110 by diagnostic processor 102 which uses these signals to produce a test result. The test result applied over maintenance bus 110 to alarm panel 101 indicates whether a fault exists in system processor 100. A display on alarm panel 101 may, for example, illuminate a green light emitting diode (LED) to indicate proper operation, or a red light emitting diode (LED) to indicate faulty operation. A fault indication requires the field engineer to initiate maintenance procedures.

System processor 100 comprises diagnostic circuit 103, test buses 114, 115, 117, 118, interrupt path 116, control bus 119, address bus 120, and circuit boards 104 through 107. Diagnostic circuit 103 in the exemplary embodiment is located apart from the processor boards. However, if desired, the diagnostic circuit may be located physically on any one or on a combination of the several boards located in the system processor.

When a hardware fault is suspected, a field engineer activates alarm panel 101 which causes diagnostic processor 102 to access the starting addresses comprising the microdiagnostic test. Diagnostic processor 102 then uses maintenance bus 110 to load the starting addresses for microdiagnostics into diagnostic circuit 103 which sequentially tests circuit boards 104 through 107 via interrupt path 116 and address bus 120, respectively. In accordance with the present invention, the most operationally independent board 107 is tested first. The most operationally independent board 107 is that board which depends on no other processor circuitry to carry on its operations.

In testing the first board 107, diagnostic processor 102 applies a signal over maintenance bus 110 and loads a starting address for a microdiagnostic subroutine into diagnostic circuit 103. This causes diagnostic circuit 103 to initiate the test by means of a signal applied over interrupt path 116 to board 107. A test may be initiated either on system initialization or at any time during normal processor operation.

For the following explanation, assume that system processor 100 is conducting normal operations when a diagnostic test is initiated. A signal is applied over path 116 from diagnostic circuit 103 to board 107 which interrupts the normal processing operations of system processor 100. The operation of the most operationally independent board 107 is interrupted. Board 107, as it is tested, transmits signals from predefined circuit test points via test bus 117 to diagnostic circuit 103. Diagnostic circuit 103 applies test signals representing the test results over maintenance bus 110 to diagnostic processor 102 at the conclusion of a microdiagnostic test subroutine. Diagnostic processor 102 determines whether the test results indicate that a fault exists on board 107. If the first board 107 tested is satisfactory, the next board 106, which is dependent only on the first board 107 for its operation, is tested. If board 106 proves satisfactory, a third board 105, the next most operationally independent board and dependent only on the operations of the first two boards (107 and 106, respectively), is tested. The testing procedure continues sequentially with the most dependent board 104 in the illustrated embodiment being tested last. Each dependent board is tested according to an associated starting address comprising the prescribed diagnostic test. The entire system processor 100 is tested when the last board is tested.

System processor 100 resumes normal processing if no fault is isolated to a particular board. However, if a fault is isolated, for example, on board 107 and this condition is indicated on an alarm panel 101, the diagnostic test stops and the field engineer can remove and replace board 107. The testing sequence can then be reinitiated. The test isolates hardware faults at the board level so that no time is wasted checking discrete components on each board. Thus, the faulty board can be quickly replaced so as to minimize interruption of the normal processing sequence.

Three considerations are significant at this point. First, an external test stimulus, diagnostic processor 102, for example, eliminates the need of the system processor 100 to rely on normal processor sequencing to access diagnostic tests from an internal source. Thus system processor 100 can be nonoperational and a test sequence can still be run to detect hardware faults.

Second, the diagnostic testing sequence is analogous to normal processing operations that require increasingly dependent circuitry to execute system processor tasks. The most operationally independent board is tested first and increasingly dependent boards are sequentially tested. The entire system processor is tested as the most dependent board is tested. The prior art method of testing each module independently, based on no particular organization of the system modules, precludes a single test of an entire system processor in its normal operational mode.

The third consideration is that a single diagnostic circuit controls the testing of all the boards in the system processor. This is again unlike prior art where one diagnostic circuit per board was used to test the processor elements. Also, for this reason, prior art design consumed more processor space than the present invention.

The above explanation describes the system processor operation as related in general to the diagnostic processor and diagnostic circuit. The following description deals specifically with the single diagnostic circuit and the operation of the diagnostic circuit as it is used to test the processor boards.

Figure 2:
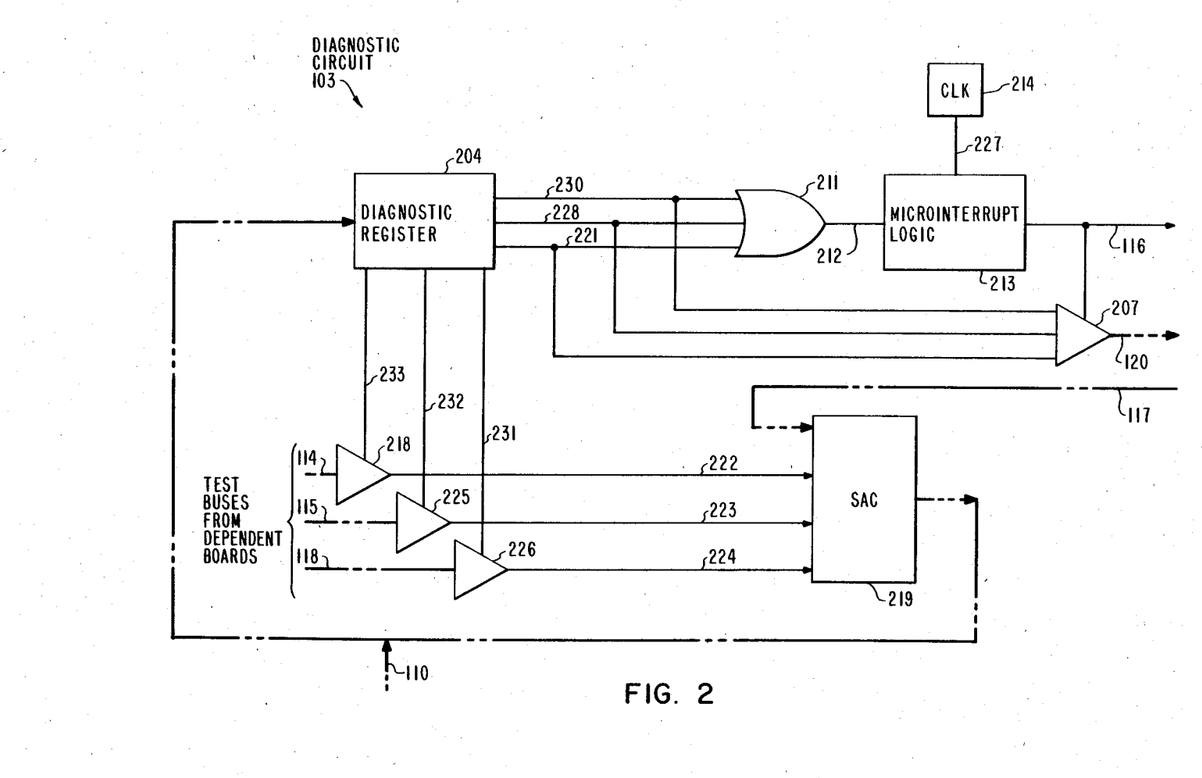
FIGS. 2 and 3, when arranged as shown in FIG. 4, disclose further details of the diagnostic circuit and the relevant elements of the most operationally independent board.
Figure 3:
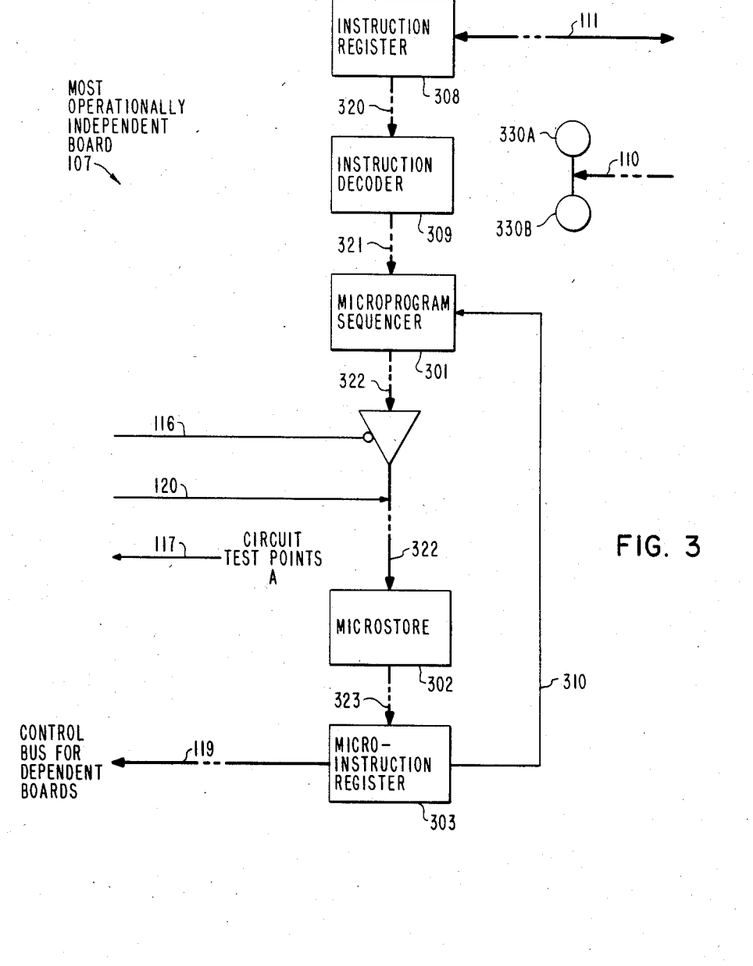
Figure 4:
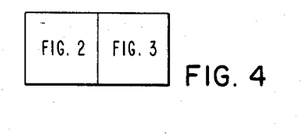

FIGS. 2 and 3, when arranged as shown in FIG. 4, illustrate the functional details of a diagnostic test as it applies to the testing of board 107. In particular, FIG. 2 shows the details of diagnostic circuit 103. FIG. 3 shows the relevant details of the most operationally independent processor board 107.

Processor Board 107

Board 107 comprises the following elements: instruction register 308, instruction decoder 309, microprogram sequencer 301, buffer 316, microstore 302 and microinstruction register 303. The elements and their normal operations are known in the art, but a brief description of their functions in the normal processing sequence will be helpful in understanding the operation of diagnostic circuit 103.

In normal operations, system processor 100 accesses program instructions from system memory 108 via system bus 111. The received program instructions specify a processor operation to be performed. The instructions are executed by dedicated circuitry located on the processor boards which function according to prescribed operations. The received program instructions are loaded into instruction register 308 over bus 111 (FIG. 3). Instruction register 308 then applies a combination of signals, as determined by the received instruction, over bus 320 to instruction decoder 309. Instruction decoder 309 decodes this instruction to provide the address of the beginning word of a microstore 302 subroutine that must be accessed in order to execute processor tasks. A microstore subroutine may comprise one or more microstore words.

Instruction decoder 309 applies signals over bus 321 to microprogram sequencer 301 once the program instruction is decoded. Microprogram sequencer 301 regulates the execution of the prescribed microstore subroutine by applying a microstore address over bus 322 via enabled buffer 316 to microstore 302. This information addresses a location in microstore 302. Microstore 302 contains several system subroutines which carry out system operations based on a series of microinstructions. The microinstructions comprise function control bits for hardware located in system processor 100 and address control bits for the next prescribed address located in microsequencer 301.

Microstore 302 writes the addressed microinstruction over bus 323 into microinstruction register 303. Microinstruction register 303 applies control signals over bus 119 to other processor boards that further carry out the operations of system processor 100. At the same instant, microinstruction register 303 applies the address control portion of the microinstruction over path 310 to microprogram sequencer 301 in order to supply the address for the next microinstruction that will be accessed. Thus, as the operation of each current instruction is executed, the address for the next instruction to be executed is applied over path 310 to obtain the subsequent instruction.

The above explanation outlines briefly the function of the most operationally independent board 107. All boards thereafter depend upon the operation of board 107 to carry out processor functions. Each board, in turn, contains circuitry that depends on the preceding board's functioning to carry out the next board's operations. The first operationally independent board must contain no hardware faults in order for the next most operationally independent board to function. These two boards must contain no hardware faults for a third board to function and so forth. Thus the circuitry on the most operationally independent board 107 provides the operational prerequisites for the following board which depend on the nonfaulty functioning of the independent board.

The following describes the elements that are typically located on the remaining system processor boards 106, 105 and 104 as illustrated in FIG. 1. Board 106 comprises an arithmetic logic unit connected to several registers and a memory. Board 105 comprises program interrupt controls, timing circuits and several registers for carrying out system processor 100 actions. Board 104 includes a program counter, a memory address register, a memory data register, and an instruction pipeline structure.

Diagnostic Circuit 103

FIG. 2 shows the details of the single circuit that serves to test the hardware located on all the processor boards. The circuit elements may be located on any one or distributed among the plurality of system processor boards, or on a separate medium as shown in FIG. 1.

Diagnostic circuit 103 is activated when the starting address of a microdiagnostic subroutine is applied over maintenance bus 110 from diagnostic processor 103.

Diagnostic circuit 103 interrupts the normal operational sequencing of system processor 100 over path 116 to begin the test. The interrupt signal over path 116 inhibits a starting address from microsequencer 301 from accessing the next microinstruction stored in microstore 302 (FIG. 3). The interrupt signal on path 116 allows the diagnostic circuitry of FIG. 2 to force a starting microstore address of a diagnostic test subroutine into the normal processing operation sequence. The test eventually verifies the absence or existence of hardware faults located on one or any of the system processor boards. Each board to be tested includes designated circuit test points which are monitored by element 219 to form an accumulated value. Hardware faults are detected if the accumulated value in element 219 is inconsistent with an expected result. An illuminated LED, for example, 330B on the board itself indicates the board with faulty hardware. A field engineer removes the faulty board from the system processor and replaces it with a new board. Such a replacement procedure is quick and efficient, and therefore minimizes the interruption of normal processor operation. However, if the accumulated value in element 219 is consistent with a predetermined value for a particular board, no fault exists as indicated by illuminated LED 330A and therefore the board is left in place.

Diagnostic circuit 103 on FIG. 2 comprises, for interrupt purposes, diagnostic register 204, OR gate 211, clock 214, microinterrupt logic circuit 213, and buffer 207. When a field engineer suspects a hardware fault in system processor 100 (FIG. 1), the engineer implements the prescribed microdiagnostic test corresponding to microdiagnostic subroutine starting addresses stored in diagnostic processor 102. The field engineer initiates the diagnostic test by selecting the appropriate code on an indicator button on alarm panel 101. Alarm panel 101 provides a signal over path 112 to diagnostic processor 102 to access a starting address for a microdiagnostic subroutine associated with the test. Diagnostic processor 102 then writes the starting address of a microdiagnostic subroutine into diagnostic register 204 over maintenance bus 110. The starting address of each microdiagnostic test subroutine contains a unique bit pattern that specifies operations to be performed by the circuitry located in diagnostic circuit 103. The address also specifies a prescribed diagnostic test subroutine in microstore 302 to be executed. Diagnostic register 204 applies all the bits in the starting address over paths 221, 228 and 230 to OR gate 211. The output of diagnostic register 204 contains at least a single 1 in any one of the available bit positions in the starting address of a microdiagnostic test subroutine whenever a microdiagnostic test subroutine address is received. The presence of one or more 1's enables OR gate 211 which applies a signal over path 212 to microinterrupt logic 213. Because the implementation of a microdiagnostic test subroutine is asynchronous to the normal processing operation, processor clock 214 applies a signal to microinterrupt logic 213 via path 227, synchronizing the signal on path 212 with the normal processing operation timing. Microinterrupt logic 213 applies a 1 over path 116 which disables buffer 316 for a specified clock time designated as a microcycle. This bit inhibits for one microcycle the normal processing sequence so that the next address from microprogram sequencer 301 is prohibited from accessing a microinstruction in microstore 302. The same signal that inhibits buffer 316 enables buffer 207.

Diagnostic register 204, applies the starting address of a microdiagnostic test subroutine over paths 221, 228 and 230 through enabled buffer 207. Buffer 207 applies the starting address of a microdiagnostic test subroutine over bus 120 to path 322. This starting address accesses a specific test subroutine in microstore 302. Microstore 302 then loads the first microinstruction of the specific microdiagnostic subroutine into microinstruction register 303.

As previously mentioned, every microinstruction comprises several bits of information. A first portion of the bits control the operations of the processor boards. A second portion of the bits applied over path 310 control the microprogram sequencer 301 which supplies the next address of a microinstruction over bus 322. To start a diagnostic test subroutine, the address of the next microinstruction is inhibited by buffer 316. Buffer 316, however, is disabled for only a single microcycle. Buffer 207 is enabled during this microcycle. Buffer 207 applies the starting address of a microdiagnostic test subroutine over bus 120 via bus 322 into microstore 302. The appropriate microinstruction is then loaded over bus 323 to microinstruction register 303. Normal sequencing resumes on the next microcycle when a portion of the microinstruction bits are applied over bus 119 to execute a test subroutine and another portion of the bits applied over path 310 to microprogram sequencer 301 to identify the next address of a microinstruction. Thereafter, microprogram sequencer 301 loads the next microinstruction address via buffer 316 into microstore 302 that writes the contents of that address into microinstruction register 303. The significant factor to consider here is that only a single microcycle is necessary to address a diagnostic test subroutine. A microdiagnostic subroutine is thereafter executed in the same manner as a normally stored processor operation subroutine and thus the address of a subroutine interrupts the normal addressing process for only one microcycle.

Buffers 218, 225 and 226 and signature analysis chip (SAC) 219 are the additional elements of diagnostic circuit 103 required for microdiagnostic test execution. In the illustrated embodiment, each board has a prescribed number of circuit points that are monitored and recorded by the SAC 219 during each microcycle. SAC 219 produces a signature that is based on the value thus recorded for each board being tested. Input from other boards is inhibited in order to record signals accurately from the circuit test points located on the board under test.

On the most operationally independent board 107 shown in FIG. 3, the various circuit test points to be monitored are designated by the "A" on board 107. Board 107 writes signals from A over path 117 into SAC 219 during a test subroutine. SAC 219 then accumulates the test signals during a microdiagnostic subroutine from board 107 only. Buffers 218, 225 and 226 inhibit circuit test point signals from all other boards, 104 through 106. The circuit has been designed so that the starting address for a board associated microdiagnostic test subroutine causes diagnostic register 204 to output a unique bit pattern such that buffers 218, 225 and 226 can be selectively disabled over paths 233, 232, and 231, respectively. The unique bit pattern associated with each board enables the connected buffer accordingly as each board comes under test. Thus, the above-mentioned buffers serve to preclude signals from being written into SAC 219 from other boards during a dedicated microdiagnostic subroutine of board 107.

Circuit test points A on board 107 (FIG. 3) are being monitored by SAC 219 during a microdiagnostic test subroutine for board 107. SAC 219 accumulates signals from the test circuit points A. The function of the SAC chip is known to the art and therefore is not explained in detail. Briefly however, the chip serves to accumulate data. A resulting signature based on this data is formed by the SAC. The signature is thereafter read by diagnostic processor 102. SAC 219 monitors all circuit test points A and forms a resulting signature indicating the accumulated value of the particular test sequence. The signature is thereafter read by diagnostic processor 102.

Diagnostic processor 102 reads the signature accumulated in SAC 219 over maintenance bus 110 (FIG. 1) at the conclusion of a microdiagnostic subroutine. Diagnostic processor 102 then compares the resulting signature read from SAC 219 with the valid known value for board 107. If the two values do not match, a signal is applied over maintenance bus 110 from diagnostic processor 102 which illuminates a a red light emitting diode (LED) 330B located on board 107. This condition indicates that board 107 contains faulty hardware. Diagnostic processor 102 also applies a signal over maintenance bus 110 to alarm panel 101 illuminating a red LED which further indicates that a fault exists. Alerted by the indication on the alarm panel, the field engineer locates board 107 which displays an illuminated red LED 330B indicating a hardware fault. The field engineer can immediately replace board 107 in response to the indication. This minimizes the interruption of normal processor functions. The field engineer now reruns the test from the alarm panel to confirm the quality of the replacement. The signature accumulated in SAC 219 for this replacement board is read by diagnostic processor 102. Diagnostic processor 102 then compares the accumulated signature value with the valid known value to determine whether the board is nonfaulty. When a signature match occurs, diagnostic processor 102 applies a signal via maintenance bus 110 to LED 330A (FIG. 3) on board 107 where green LED 330A is illuminated to indicate no hardware faults.

The quality of replacement board 107 having been confirmed, further microdiagnostic subroutines are initiated by microinstruction register 303 which loads a new starting address for the next board to be tested into diagnostic register 204. Each new address implements another microdiagnostic test subroutine. Boards are tested sequentially, testing the next most operationally independent board first, and then the next most operationally independent board, and then the next most operationally independent board, and so on until the entire processor has been monitored for hardware faults.

All boards, 104 through 106 in the illustrated embodiment, are tested in the same manner as described for board 107. The diagnostic processor 102 accesses the next starting address of a designated microdiagnostic subroutine for the next most operationally independent board, here 106, to be tested. A test sequence is run using the same logic circuit as was used for board 107. The only operational difference is that buffer 226 is enabled by a signal applied over path 231. This serves to enable signals from board 106 to be accumulated with signals from circuit test points A of board 107. However, signals from dependent boards 105 and 104 are still inhibited by the signals applied over paths 232 and 233 into buffers 218 and 225, respectively.

SAC 219 monitors, accumulates, and records signals from circuit test points on boards 107 and 106 when board 106 is tested. Buffers 218 and 225 inhibit signals from other system processor boards 104 and 105. Board 106, dependent on board 107 for its operation, is tested. The signature result in the SAC 219 is the accumulation of signals from circuit test points on board 106 and its dependent circuitry located on 107. If this board proves satisfactory, the next dependent board 105 is checked. Board 105 is checked in the same manner where signals are inhibited from dependent board 104 and board 105 is checked in the context of its operational dependency on boards 107 and 106. If the resulting signature indicates no fault, the next board in the operationally dependent sequence is checked. Again the board is checked in the same manner and by the same circuitry and signals from dependent circuitry which are now enabled for testing purposes. If board 104 proves satisfactory, the entire processor has been checked. Signatures of the entire processor are thus accumulated and written and read out of the single SAC 219 located in diagnostic circuit 103.

The microdiagnostic subroutines are no longer required once the entire processor has been tested and no further indication of hardware faults exist. Therefore, diagnostic processor 102 loads diagnostic register 204 with a final starting address having 0's in every available bit position. Diagnostic register 204 then applies a 0 over paths 221, 228 and 230 to OR gate 211 which applies a 0 over path 212 to microinterrupt logic 213. The 0 indicates to microinterrupt logic 227 that the test sequence has ended, and that no further microdiagnostics are required. Since there are no further subroutines required, there is no interrupt request from microinterrupt logic 213. Microprogram sequencer 301 (FIG. 3) then resumes normal instruction execution from a starting address accessed from system memory 108 and the normal processor operation subroutine previously described resumes. At the conclusion of a microdiagnostic test, alarm panel 101 indicates, by an illuminated green LED, that all boards have passed. However, a red LED is illuminated on alarm panel 101 to indicate a board or boards failure.

The plurality of boards located in a system processor are checked in a sequential hierarchical manner such that the operations of the boards might be checked within the context of normal operational parameters rather than using a piecemeal approach that ignores the interdependencies of boards. This testing method for checking suspected hardware faults by a single diagnostic circuit allows for a more efficient and economical procedure. A system processor is tested according to the scheme of the present invention using dependent circuitry to execute diagnostic test subroutines. However, the starting addresses for the microdiagnostic subroutines are supplied from an external source which is not dependent on any circuitry within the system processor 100 to start a microdiagnostic test sequence.

What is claimed is:
1. A method of testing a data processor comprising a plurality of operationally interdependent discrete circuit groups hierarchically arranged with respect to operational dependency in processor function, said method comprising the steps of:

(1) storing a plurality of diagnostic test subroutines in a memory to sequentially test said plurality of discrete circuit groups, (2) applying a diagnostic test subroutine address to said memory where said address represents the address of a first one of said diagnostic test subroutines associated with the testing of said first circuit group having the least operational dependency in said processor function, (3) executing said first diagnostic test subroutine in response to the receipt of said address, (4) collecting test data applied from circuit test points associated with said first circuit group during the execution of said first diagnostic test subroutine, (5) comparing said collected test data from said first circuit group with priorly derived predicted test data for said first circuit group, and (6) testing in sequence based on operational dependency the others of said circuit groups of said hierarchy if said collected test data for said first circuit group matches said predicted data for said first circuit group.

2. The method of claim 1 wherein the step of testing said other circuit groups comprises the steps of:

(1) applying a second diagnostic test subroutine address to said memory where said second address represents the address of a second one of said diagnostic test subroutines associated with the testing of a second circuit group in said sequence of said hierarchy wherein said second circuit group has an operational dependency on said first circuit group and has the next least operational dependency in said processor function, (2) executing said second diagnostic test subroutine in response to the receipt of said second address, (3) collecting test data from circuit test points in said first and second circuit groups as said second diagnostic test subroutine is executed, (4) comparing said collected test data from said first and second circuit groups with priorly derived predicted test data for said second circuit group, and (5) testing in sequence based on operational dependency the remaining untested circuit groups of said hierarchy if said collected test data for said second circuit group matches said predicted data for said second circuit group.

3. The method of claim 2 wherein the step of testing said remaining untested circuit groups comprises the steps of:

(1) executing in sequence based on operational dependency of each of said remaining untested circuit groups a diagnostic test subroutine unique to each of said remaining untested circuit groups, (2) collecting test data applied from circuit test points associated with each currently tested circuit group and each priorly tested less dependent circuit groups during the execution of a unique diagnostic test subroutine associated with said currently tested circuit group, (3) comparing said collected test data from said currently tested circuit group and said priorly tested less dependent circuit groups with priorly derived predicted test data for said currently tested circuit group, and (4) testing one by one all increasingly dependent untested circuit groups in the sequence of said hierarchy if said collected test data for said currently tested circuit group matches predicted data for said currently tested circuit group.

4. A method of testing a data processor comprising a plurality of operationally interdependent circuit boards hierarchically arranged with respect to operational dependency in processor function, said method comprising the steps of:

(1) storing a plurality of microdiagnostic test subroutines in a microstore memory to sequentially test said plurality of boards, (2) applying a microdiagnostic test subroutine address to said microstore memory where said address represents the address of a first one of said microdiagnostic test subroutines associated with the testing of said first board having the least operational dependency in said processor function, (3) executing said first microdiagnostic test subroutine by operating the circuitry on said first board in response to the receipt of said address, (4) collecting test data applied from circuit test points on said first board during the execution of said first microdiagnostic test subroutine, (5) inhibiting the collection of test data from the others of said boards during the execution of said microdiagnostic test subroutine on said first board, (6) comparing said collected test data from said first board with priorly derived predicted test data for said first board, and (7) testing in sequence based on operational dependency others of said boards situated in said hierarchy if said collected data for said first board matches said predicted data for said first board.

5. The method of claim 4 wherein the step of testing said other boards comprises the steps of:

(1) applying a second microdiagnostic test subroutine address to said microstore where said second address represents the address of a second one of said microdiagnostic test subroutines associated with the testing of a second board in said sequence of said hierarchy wherein said second board has an operational dependency on said first board and has the next least operational dependency in said processor function, (2) executing said second microdiagnostic test subroutine by operating circuitry on said first and second boards while collecting test data from circuit test points on said first and second boards in response to the receipt of said second address, (3) comparing said collected test data from said first and second boards with priorly derived predicted test data for said second board, (4) inhibiting said collection of data from the remaining untested ones of said boards in said sequence while testing said first and second boards, and (5) testing in sequence based on operational dependency said remaining untested boards of said hierarchy if said collected test data for said second board matches said predicted data for said second board.

6. The method of claim 5 wherein the step of testing said remaining untested boards comprises the steps of:

(1) executing in sequence based on operational dependency of each of said remaining untested boards a microdiagnostic test subroutine unique to each of said remaining boards, (2) operating circuitry on a currently tested board and on each priorly tested less dependent board in said hierarchy during the execution of a unique microdiagnostic test subroutine associated with said currently tested board, (3) collecting test data from circuit test points on each currently tested board and on all of said priorly tested less dependent boards during the execution said unique microdiagnostic test subroutine associated with said currently tested board, (4) comparing said collected test data from said currently tested board and said priorly tested less dependent boards with priorly derived predicted test data for said currently tested board, and (5) testing one by one all increasingly dependent untested boards in the sequence of said hierarchy if said collected test data for said currently tested board matches predicted data for said currently tested board.

7. In a data processor comprising a plurality of operationally interdependent discrete circuit groups hierarchically arranged with respect to operational dependency in processor function:

a memory for storing a plurality of diagnostic test subroutines to sequentially test based on a hierarchical operational dependency said plurality of discrete circuit groups, means for applying a diagnostic test subroutine address to said memory where said address represents the address of a first one of said diagnostic test subroutines associated with the testing of said first circuit group having the least operational dependency in said processor function, means for executing said first diagnostic test subroutine in response to the receipt of said address, means for collecting test data applied from circuit test points associated with said first circuit group during the execution of said first diagnostic test subroutine, means for comparing said collected test data with priorly derived predicted test data for said first circuit group, and means for testing in sequence based on operational dependency others of said circuit groups if said collected test data from said first circuit group matches said predicted test data for said first circuit group.

8. The processor of claim 7 wherein said processor further comprises:

means for applying a second diagnostic test subroutine address to said memory where said address represents the address of a second one of said diagnostic test subroutines to test a second circuit group in the sequence having an operational dependency on said first circuit group and having the next least operational dependency in said processor function, means for executing said second diagnostic test subroutine by operating circuitry in said first and second circuit groups while collecting test data applied from circuit test points associated with said first and second circuit groups, means for comparing said collected test data from said first and second circuit groups with priorly derived predicted test data for said second circuit group, and means for testing in sequence based on operational dependency the remaining ones of said circuit groups of said hierarchy if said collected data from said second circuit group matches said predicted data for said second circuit group.

9. In a data processor comprising a plurality of operationally interdependent circuit boards hierarchically arranged with respect to operational dependency in processor function:

a microstore memory for storing a plurality of microdiagnostic test subroutines to sequentially test said boards, means for applying a microdiagnostic test subroutine address to said microstore memory where said address represents the address of a first one of said microdiagnostic test subroutines associated with the testing of said first board having the least operational dependency in said processor function, means for executing said first microdiagnostic test subroutine in response to the receipt of said address, means for collecting test data applied from circuit test points on said first board during the execution of said first microdiagnostic test subroutine, means for comparing said collected test data with priorly derived predicted test data for said first board, means for inhibiting the collection of test data from circuitry on others of said boards during the execution of said microdiagnostic test subroutine on said first board, and means for testing in sequence based on operational dependency said others boards if said collected test data from said first board matches said predicted test data for said first board.

10. The processor of claim 9 wherein said processor further comprises:

means for applying a second microdiagnostic test subroutine address to said microstore memory where said second address represents said address of a second one of said microdiagnostic test subroutines to test a second board in said sequence of said hierarchy having an operational dependency on said first board and having the next least operational dependency in said processor function, means for executing said second microdiagnostic test subroutine by operating circuitry on said first and second boards while collecting test data applied from circuit test points associated with said first and second boards, means for comparing said collected test data from said first and second boards with priorly derived predicted test data for said second board, means for inhibiting the collection of data from the remaining ones of said untested boards in said sequence of said hierarchy during the execution of said second one of said microdiagnostic test subroutines on said first and second boards, and means for testing in sequence based on operational dependency the remaining ones of said untested boards of said hierarchy if said collected data from said second board matches said predicted data for said second board.

11. In a data processor comprising a plurality of operationally interdependent circuit boards hierarchically arranged with respect to operational dependency in processor function:

a microstore memory for storing subroutines including a plurality of microdiagnostic test subroutines to sequentially test in order of operational dependency said boards, an instruction register for receiving program instructions from a system memory to identify one of said subroutines in said microstore memory, a first means for applying each received instruction from said register to said microstore memory to select a processing operation for said processor wherein each instruction represents an address associated with an identified one of said subroutines to be executed by said processor, a diagnostic circuit, a second means for applying an indication of a receipt of a microdiagnostic test subroutine address associated with said plurality of microdiagnostic test subroutines from said register to said diagnostic circuit, means in said diagnostic circuit responsive to the receipt of said indication for inhibiting said application of an instruction by said first means and for applying said received microdiagnostic test subroutine address to said microstore memory where said address represents the address of a first one of said microdiagnostic test subroutines associated with the testing of said first board having the least operational dependency in said processor function, means for executing said first microdiagnostic test subroutine in response to the receipt of said address, means for collecting test data applied from circuit test points on said first board during the execution of said first microdiagnostic test subroutine, means for comparing said collected test data with priorly derived predicted test data for said first board, means for inhibiting the collection of test data from circuitry on the others of said boards during the execution of said first microdiagnostic test subroutine on said first board, and means for testing in sequence based on operational dependency said other boards if said collected test data from said first board matches said predicted test data for said first board.

12. The processor of claim 11 wherein said diagnostic circuit comprises:

an input register for receiving microdiagnostic test subroutine addresses from a diagnostic processor, means responsive to the receipt of a one of said microdiagnostic test subroutine addresses by said register for generating a data processor interrupt signal, means responsive to the generation of said interrupt signal for inhibiting said first means for applying to prevent the application of said instructions, and means further responsive to the receipt of said one of said microdiagnostic test subroutine addresses by said register for applying said one of said microdiagnostic test subroutine addresses to said diagnostic processor to test a one of the plurality of circuit boards associated with said microdiagnostic test subroutine.

13. The process of claim 11 or 12 wherein said means for inhibiting the collection of said test data comprises:

a unique path associated with each of said plurality of circuit boards exclusive of said first board extending to said means for collecting test data for transmitting signals from circuit test points when an associated board and all less dependent boards are tested, and means in said input register responsive to the receipt of an address of one of said microdiagnostic test subroutines pertaining to a board other than said last board in said sequence for selectively enabling the inhibiting means of each unique path extending to a subsequent untested board in said hierarchical sequence of operational dependency.

* * * * *